(12) United States Patent
Kawai

(10) Patent No.: US 6,250,354 B1
(45) Date of Patent: Jun. 26, 2001

(54) VEHICLE TIRE INCLUDING SIPES EXTENDING ACROSS RIB

(75) Inventor: Toru Kawai, Nishinomiya (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/259,293

(22) Filed: Mar. 1, 1999

(30) Foreign Application Priority Data

Mar. 4, 1998 (JP) .................................................. 10-052411

(51) Int. Cl.⁷ .......................... B60C 11/12; B60C 101/00; B60C 101/02; B60C 105/00
(52) U.S. Cl. ................ 152/209.18; 152/209.21; 152/903; 152/DIG. 3
(58) Field of Search ............................ 152/209.1, 209.18, 152/209.21, DIG. 3, 903

(56) References Cited

U.S. PATENT DOCUMENTS

| | | | | |
|---|---|---|---|---|
| 2,716,435 | * | 8/1955 | Herzegh | 152/209.18 |
| 4,481,992 | * | 11/1984 | Takigawa et al. | 152/209.1 |
| 5,386,861 | * | 2/1995 | Overhoff et al. | 152/209.21 |
| 5,785,780 | * | 7/1998 | Ochi | 152/DIG. 3 |
| 5,873,399 | * | 2/1999 | Ochi et al. | 152/DIG. 3 |

FOREIGN PATENT DOCUMENTS

| | | | | |
|---|---|---|---|---|
| 330643 | * | 8/1989 | (EP) | 152/209.18 |
| 715972 | * | 6/1996 | (EP) | 152/DIG. 3 |
| 61-1508 | * | 1/1986 | (JP) | 152/DIG. 3 |
| 63-291705 | * | 11/1988 | (JP) | 152/DIG. 3 |
| 3-271007 | * | 12/1991 | (JP) | 152/209.18 |
| 6-312603 | * | 11/1994 | (JP) | 152/209.21 |

* cited by examiner

Primary Examiner—Steven D. Maki
(74) Attorney, Agent, or Firm—Birch, Stewart, Kolasch & Birch, LLP.

(57) ABSTRACT

A vehicle tire includes a tread portion provided with a plurality of blocks and at least one circumferential rib, the circumferential rib having a first side face facing a circumferential groove and a second side face, and first side face being corrugated to form furrows and ridges which are arranged alternatively in the circumferential direction and extend radially of the tire, the corrugation having an amplitude Lb in the range of 0.5 to 2.0 mm, the circumferential rib being provided with sipes extending thereacross so that each sipe has an end opened in one of the furrows on the first side face and an end opened in said second side face, and the spacings La of the sipes being in the range of 2.0 to 5.0 mm. Each of the sipe has a zigzag middle part.

9 Claims, 5 Drawing Sheets

VEHICLE TIRE INCLUDING SIPES EXTENDING ACROSS RIB

BACKGROUND OF INVENTION

The present invention relates to a vehicle tire suitable for running on ice-covered roads, more particularly to an improved tread portion of a rib-block tread pattern capable of improving on-the-ice performance.

DESCRIPTION OF RELATED ART

In general, pneumatic tires called "winter tire", "snow tire", "studless tire" and the like used on snowy and icy roads are provided in the tread portion with a number of blocks to obtain a good on-the-snow performance. And, a large number of sipes are disposed on the blocks to increase edges to obtain a good on-the-ice performance.

Further, rib-block patterns comprising blocks and a circumferential rib are also popular in pneumatic tires for used on ice-covered well-paved roads such as asphalt road. Such a circumferential rib is also provided with sipes in order to improve on-the-ice performance.

In such rib-block patterns, however, as shown in FIG. 8, as the sipes (b) close in the ground contacting patch, the circumferential rib (a) behaves like one body although it is divided by the sipes (b), and the apparent rigidity in the circumferential direction is still high. Thus, the parts (a1) divided by the sipes hardly lean towards one circumferential direction. Accordingly, it is difficult for the edges of the sipes (b) to scratch or engage with the iced road surface. If the spacings of the sipes (b) are decreased in order to decrease the apparent rigidity, the parts (a1) suffer from uneven wear, cracks and tear-off. Thus the durability greatly decreases.

SUMMARY OF INVENTION

It is therefore an object of the present invention to provide a pneumatic tire in which, parts of a circumferential rib divided by sipes are leant appropriately without decreasing the apparent rigidity of the rib, and accordingly, the edges thereof effectively engage with the road surface to increase the traction without deteriorating the durability.

BRIEF DESCRIPTION OF THE DRAWINGS

Embodiments of the present invention will now be described in detail in conjunction with the accompanying drawings.

DETAILED DESCRIPTION OF INVENTION

Figure 1:
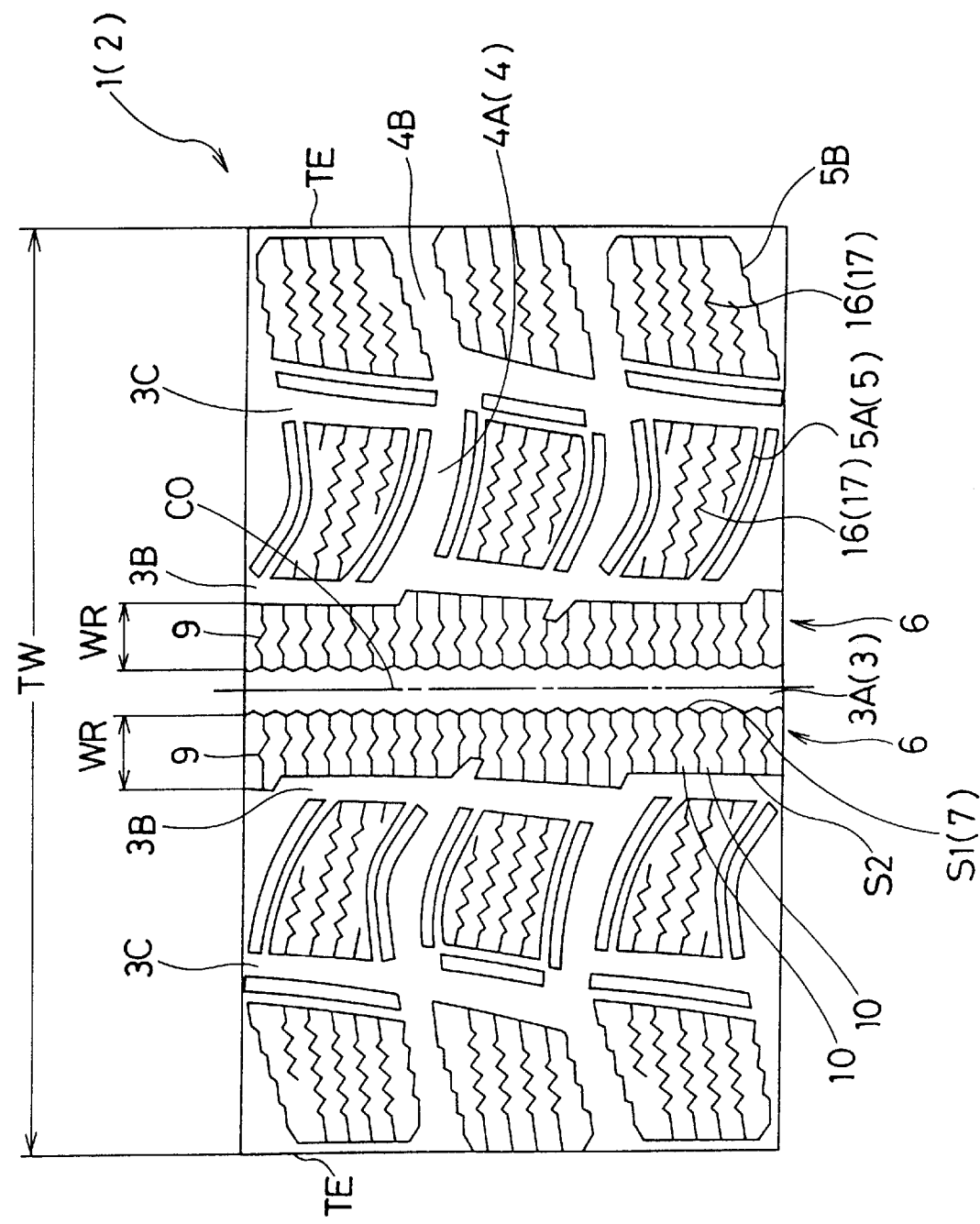
FIG. 1 is a developed plan view of an embodiment of the present invention.

In the drawings, the tire 1 according to the present invention is a pneumatic tire called "studless tire" for passenger cars. The tire 1 comprises a tread portion 2, a pair of axially spaced bead portions with a bead core therein, a pair of sidewall portions extending between the tread edges and the bead portions, a carcass extending between the bead portions, and a belt disposed radially outside the carcass in the tread portion.

The tread portion 2 is provided with circumferential grooves 3 and transverse grooves 4 to form a rib-block pattern comprising a plurality of rows of blocks 5 and a plurality of circumferentially extending ribs 6.

In case of passenger car tires, the circumferential grooves 3 and transverse grooves 4 have a width in the range of 3 to 25 mm and a depth in the range of 8 to 15 mm.

In this embodiment, the circumferential grooves 3 include: a central circumferential groove 3A on the tire equator CO; a pair of middle circumferential grooves 3B; and a pair of axially outer circumferential grooves 3C. The central circumferential groove 3A is straight. The middle circumferential grooves 3B are zigzag which consists of alternate short segments and very long segments, but can be regarded as generally straight. The transverse grooves 4 include: transverse grooves 4A each extending from one of the middle circumferential grooves 3B to the adjacent outer circumferential groove 3C; and transverse grooves 4B each extending from one of the outer circumferential grooves 3C to the adjacent tread edge TE. Thus, the rib-block pattern is made up of: two ribs 6 each defined between the substantially straight groove 3A and one of the generally straight grooves 3B: two rows of middle blocks 5A between the grooves 3B and 3C; and two rows of shoulder blocks 5B between the grooves 3C and tread edges TE. The circumferential grooves 3 and transverse grooves 4 in this embodiment are the substantially same depth H1 of about 10 mm.

The ratio SS/TS of the total area of the top surfaces of the blocks 5 and ribs 6 to the overall ground contacting area TS is set in the range of from 0.5 to 0.8 to obtain a good adhesive frictional force.

It is preferable for on-the-snow running performance that the circumferential ribs 6 are disposed in the tread center where the ground pressure is relatively high. Thus, in case of two ribs as in this example, they are preferably disposed on both sides of the tire equator CO. In case of a single rib, it is disposed on the tire equator CO.

The total width of the circumferential ribs 6 (in this embodiment WR+WR) is preferably set in the range of from 0.1 to 0.3 times the ground contacting width TW.

Each circumferential rib 6 is provided with sipes 9 extending axially across the overall width of the rib 6.

Here, the sipes 9 are a cut having a width in the range of less than 1.5 mm, preferably less than 1.0 mm. The depth H3 thereof is in the range of from 1.0 to 0.5 times the circumferential groove depth H1.

Further, at least one, preferably only one of the side faces S of each rib 6 facing the circumferential grooves 3 is corrugated, wherein the corrugation is made up of furrows and ridges which are arranged alternately in the circumferential direction and extend radially of the tire.

Figure 2:
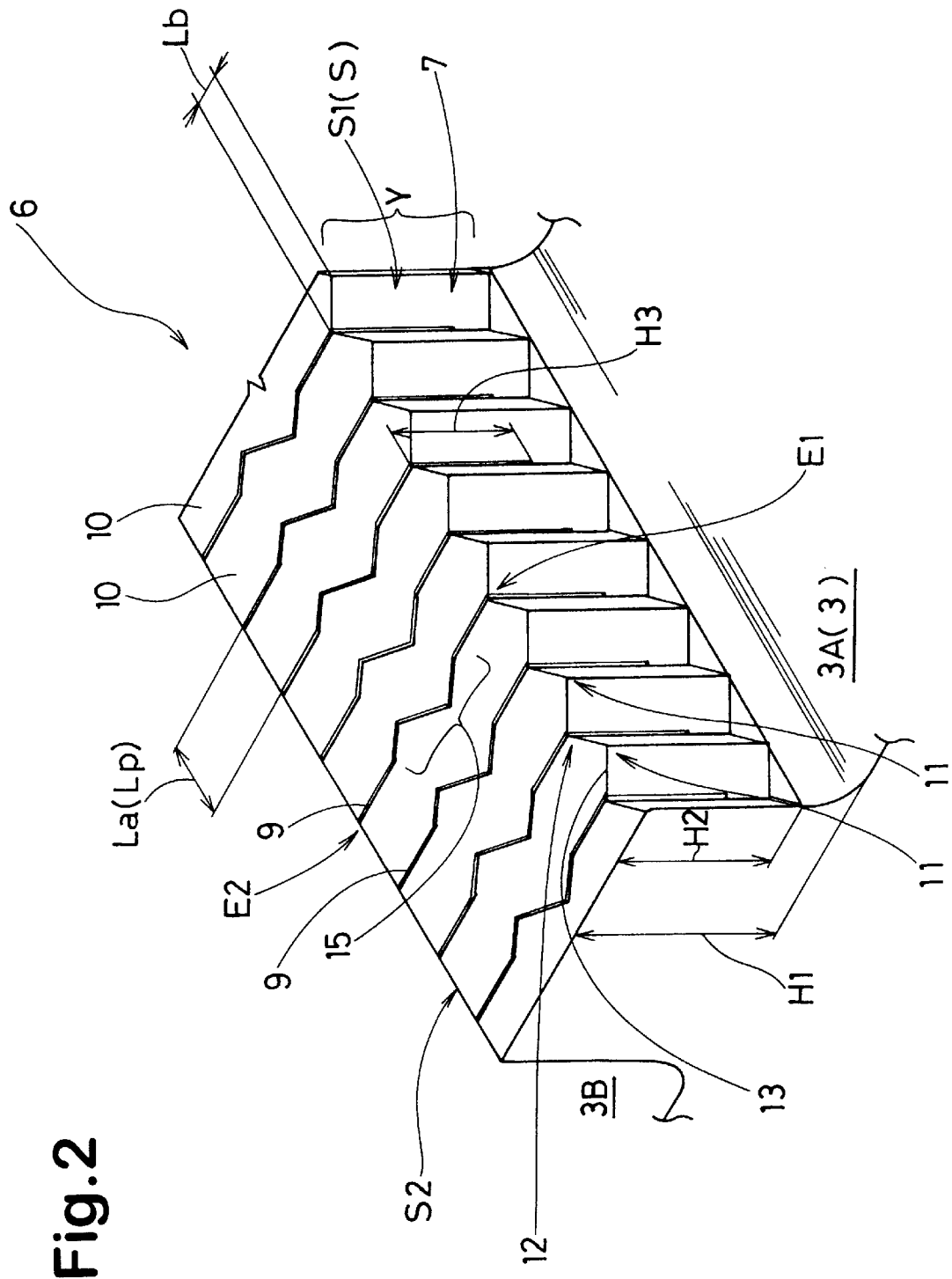
FIG. 2 is an enlarged perspective view of the circumferential rib thereof.

In the example shown in FIGS. 1 and 2, the configuration of the corrugated part 7 is an original zigzag consisting of straight sides 13 having the same lengths, and the inclination angles of the sides 13 with respect to the axial direction are the same absolute value.

Figure 3:
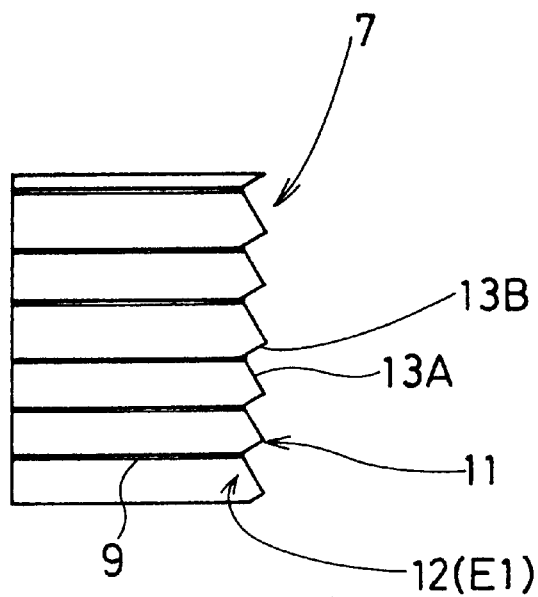
FIGS. 3, 4 and 5 show other examples of the circumferential rib

In FIG. 3 which shows a modification of the corrugated part 7, the zigzag consists of longer sides 13A and shorter sides 13B, and the inclination angle with respect to the axial direction is smaller in the shorter sides 13B than the longer sides 13A.

Figure 4:
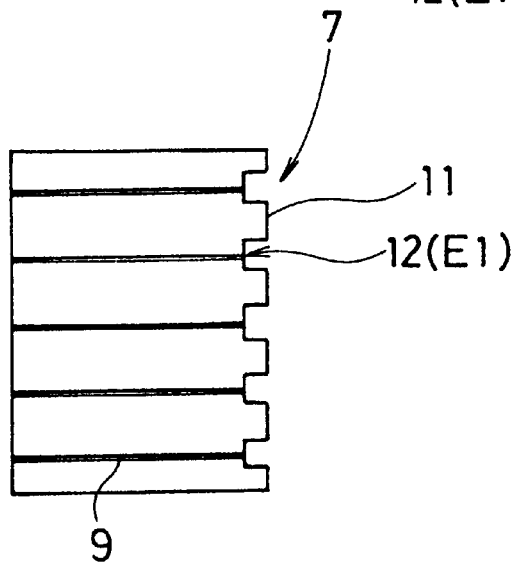

In FIG. 4 showing another example, the corrugated part 7 has a configuration like a rectangular wave different from the former examples in a sawtooth waveform.

Further, it is also possible to use gently curved configurations such as sinusoidal waveform and the like.

The amplitude Lb of the corrugation is set in the range of from 0.5 to 2.0 mm. The amplitude Lb is defined as the axial distance between an axially innermost point and an axially outermost point which are adjacent each other in the circumferential direction. For example, in case of the zigzag shown in FIG. 2 or FIG. 3, the amplitude Lb is between the outside corner 11 and inside corner 12. In case of the rectangular waveform shown in FIG. 4, the amplitude Lb is between the axially outer side and axially inner side which extend in parallel with the longitudinal direction of the circumferential groove.

The amplitude Lb in this embodiment is constant in the circumferential direction, but it may be varied.

The corrugated part 7 on the side face S extends radially inwardly from the tread surface to a depth H2 of not less than 0.7 times the circumferential groove depth H1.

In FIG. 2, the amplitude Lb is constant in the radial direction from the tread face to the radially inner end. It is however, possible to change the amplitude, for example, such that it gradually decreases from the tread face to the groove bottom to increase the crack resistance of groove bottom.

Figure 5:
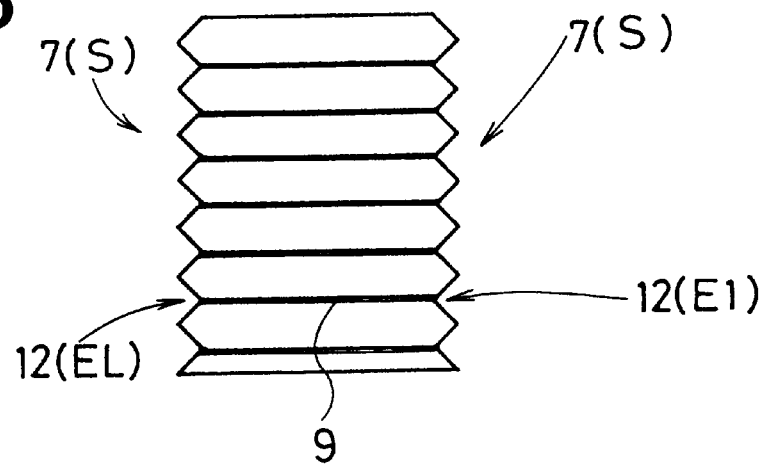

In this embodiment, as shown in FIG. 1 and FIG. 2, the axially inner side face S1 facing the central circumferential groove 3A is corrugated, but the axially outer side face S2 is formed in a generally straight configuration. However, as shown in FIG. 5, both the side faces S of a circumferential rib 6 may be corrugated The above-mentioned sipes 9 extends across the width of the rib 6 as explained above so as to open in both the side faces S of the rib. In the corrugated part 7, the sipes 9 open at a position in the furrows (in FIGS. 2 and 3, at the inside corners 12; in FIG. 4, the mid-point of the axially inner sides). In FIG. 5 where both the side faces S are corrugated, both the ends E1 and E2 of each sipe 9 are opened at the inside corners 12.

The spacings La of the sipes 9 are set in the range of from 2.0 to 5.0 mm. The zigzag pitch lengths Lp of the corrugated part 7 are also set in the range of from 2.0 to 5.0 mm. Preferably, the pitch lengths Lp and spacings La are the same. However, it is also possible to dispose sipes 9 every two or three zigzag pitches. In such a case, the pitch lengths Lp are preferably not less than 2.0 mm.

Preferably, as shown in FIGS. 1 and 2, each sipe 9 is provided in the middle of the length with a zigzag part 15. In addition to original zigzag, various configurations such as sawtooth waveform, rectangular waveform and the like can be used for the zigzag parts 15. In any case, the remaining parts on the axially inside and outside of the zigzag part 15 of each sipe 9 are formed in a straight form which is parallel with the axial direction.

Further, as shown in FIG. 1, each of the blocks 5A and 5B is provided with a plurality of axial sipes 17 having a zigzag part 16 between axially extending inner and outer parts similarly to the sipe 9.

Figure 6A:
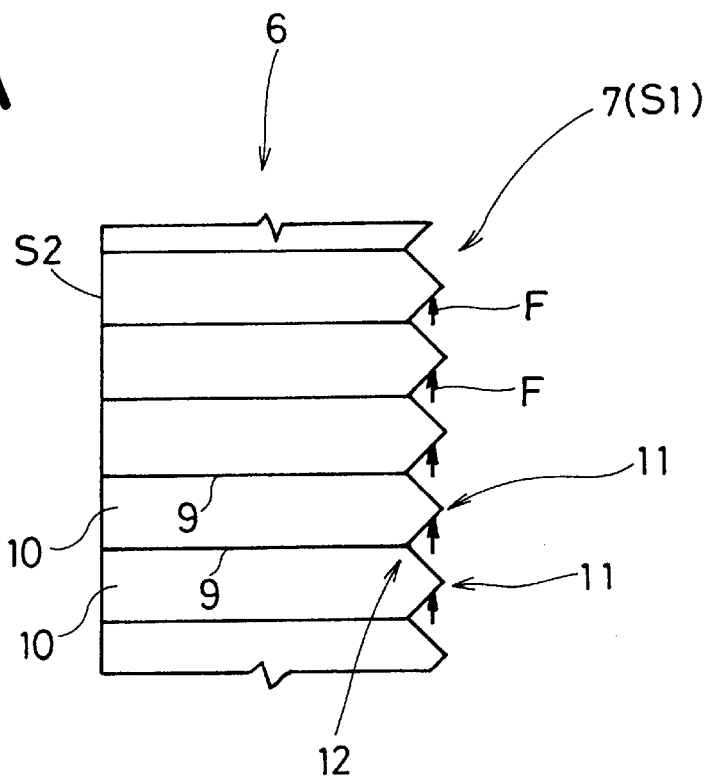
FIG. 6A and FIG. 6B are a partial plan view and side view of the circumferential rib for explaining functions thereof.
Figure 6B:
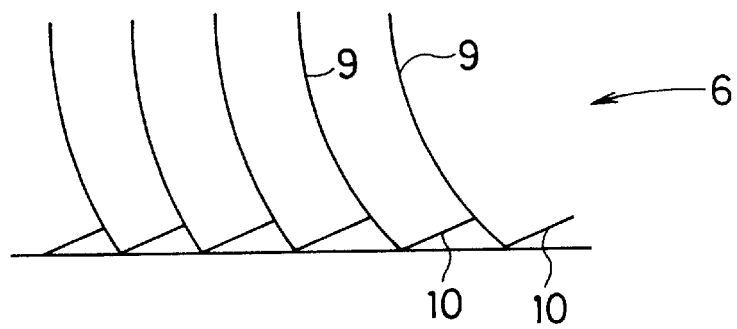

Therefore, when running on the snow roads, the snow pressed into the circumferential groove engages with the corrugated part 7, and a big road grip can be obtained. Further, the corrugated part 7 provides a zigzag edge on the tread surface, which also improves the ice road grip. On the other hand, when running on the ice roads, as shown in FIG. 6A, a force F is applied to the zigzag edge of the corrugated part 7 by the road surface. This force F separates the thin parts 10 which are divided by the sipes 9 but adhere each other in the ground contacting patch due to the ground pressure. As a result, it is easier for the thin parts 10 to lean in a circumferential direction, and it becomes possible for the edges of the thin parts 10 to contact or engage with the surface of ice at optimum angles as shown in FIG. 6B. Thus, on-the-ice performance can be greatly improved.

Test tires having the tread pattern shown in FIG. 1 were made and tested for the braking performance. The test tires were provided with the same structure except for the spacings La of sipes and the amplitude Lb of corrugation.

In the test, a 2000 cc FR passenger car provided on all the wheels with test tires was run on an ice-covered test road, and a wheel-lock brake in which all the four wheels are locked was applied to the test car at a running speed of 40 km/hr. And the running distance to stop was measured. In Table 1, the reciprocal value of the running distance is indicated, using an index based on a tire (La=4.0 mm and Lb=0) being 100. The larger the index, the better the performance.

Tire size: 195/65R15
Rim size: 6JJX 15
Inner pressure: 200 kpa

TABLE 1

| Amplitude Lb (mm) | Spacing La (mm) | | | | |
|---|---|---|---|---|---|
| | 1.5 | 2.0 | 4.0 | 5.0 | 6.0 |
| 0.0 | 105 | 103 | 100 | 96 | 89 |
| 0.2 | 104 | 104 | 102 | 100 | 91 |
| 0.5 | 102 | 110 | 110 | 108 | 102 |
| 1.0 | 103 | 114 | 114 | 111 | 105 |
| 1.5 | 104 | 112 | 113 | 110 | 105 |
| 2.0 | 102 | 110 | 111 | 108 | 101 |
| 2.5 | 98 | 106 | 108 | 105 | 92 |

It was confirmed that the on-the-ice braking performance can be effectively improved when the sipe spacing La is in the range of 2.0 to 5.0 mm and the corrugation amplitude Lb is in the range of 0.5 to 2.0 mm.

When the spacing La is less than 2.0 mm, the parts 10 divided by the sipes 9 are too thin to scratch the surface of ice road, and the on-the-ice performance deteriorates. Further, the rib excessively decreases in the rigidity to deteriorate running stability and wear resistance. When the spacing La is more than 5.0 mm, as the number of the sipes 9 in the ground contacting patch decreases, it is difficult to improve on-the-ice performance.

When the amplitude Lb is less than 0.5 mm, it is difficult to obtain the above-mentioned advantageous effects, namely, the leaning of the narrow parts 10, the ice-scratching effect of the zigzag edge, and the engaging with the compact snow. When the amplitude Lb is more than 2.0 mm, uneven wear increases.

Figure 7A:
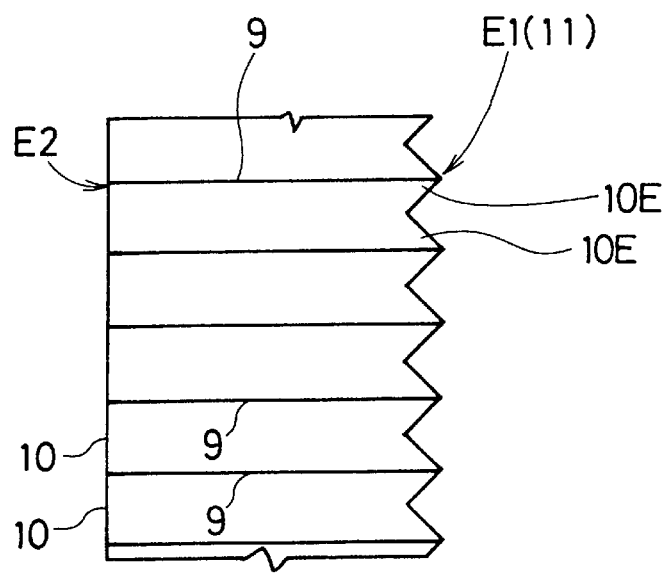
FIG. 7A and FIG. 7B are plan views of a circumferential rib provided with sipes in unsuitable positions.
Figure 7B:
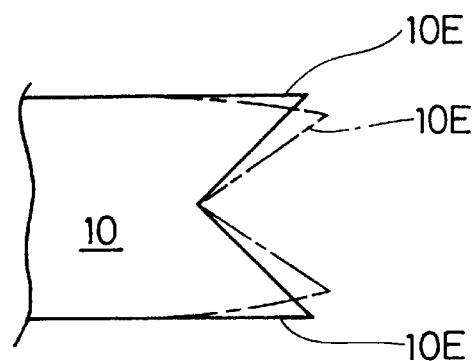
Figure 8:
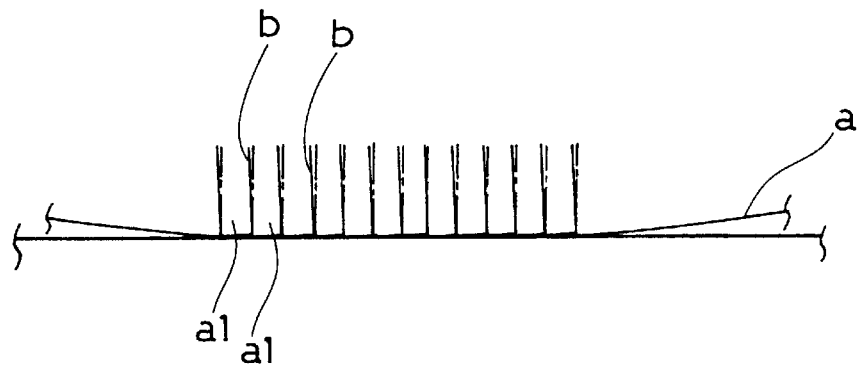
FIG. 8 is a diagram for explaining a problem in the prior art.

If the ends of the sipes 9 are opened in the ridges (for example at the outside corners 11) as shown in FIG. 7A, the rigidity of the narrow part 10 is excessively lowered at the axial ends 10E, and the end portion 10E itself is deformed or leans rather than the entire thin part 10 as shown in FIG. 7B. Thus, the edge effect by the sipes can not be obtained, and uneven wear is liable to occur at the end portions 10E.

The present invention can be applied to various tires, for example, heavy duty tires for trucks and buses, light truck tires and the like in addition to passenger car tires.

What is claimed is:

1. A vehicle tire comprising a tread portion provided with a plurality of blocks and at least one circumferential rib, said at least one circumferential rib having a first side face facing a circumferential groove and a second side face, said first side face being corrugated to form furrows and ridges which are arranged alternately in the circumferential direction and extend radially of the tire, an amplitude of the corrugation being in the range of 0.5 to 2.0 mm, said second side face not provided with the corrugation, and sipes extending across said circumferential rib so that each sipe has an end opened in one of the furrows on the first side face and an end opened in said second side face, the sipes having a pair of end portions extending substantially parallel with the tire axial direction and a zigzag middle portion extending therebetween, one of the end portions extending from the first side face and the other end portions extending from the second side face, wherein spacings between the sipes are in the range of 2.0 to 5.0 mm.

2. The vehicle tire according to claim 1, wherein said at least one circumferential rib is substantially straight.

3. The vehicle tire according to claim 1, wherein said at least one circumferential rib is two circumferential ribs each disposed on one side of the tire equator.

4. The vehicle tire according to claim 1, wherein said at least one circumferential rib is disposed in the axial center of the tread portion, and said blocks are arranged in four circumferential rows.

5. The vehicle tire according to claim 1, wherein each said block is provided with sipes having a zigzag middle part.

6. The vehicle tire according to claim 1, wherein said end portions of the sipes are disposed in a line parallel to the tire axial direction.

7. The vehicle tire according to claim 1, wherein the corrugation has a triangular waveform or a rectangular waveform or a sawtooth waveform.

8. A vehicle tire comprising a tread portion provided with a circumferential groove extending along the tire equator, a circumferential rib disposed on each side of said circumferential groove, and a plurality of blocks disposed axially outside said circumferential rib, said circumferential rib having an axially inner side face facing the circumferential groove and an axially outer side face, said axially inner side face being provided with corrugation having an amplitude of from 0.5 to 2.0 mm to form furrows and ridges which are arranged alternately in the circumferential direction and extend radially of the tire, but said axially outer side face being not provided with corrugation, and sipes extending across said circumferential rib so that each sipe has an end opened in one of the furrows on the axially inner side face and an end opened in the axially outer side face, the sipes having a pair of end portions extending substantially parallel with respect to the tire axial direction and a zigzag middle portion extending therebetween, one of the end portions extending from the axially inner side face and the outer end portion extending from the axially outer side face, wherein spacings between the sipes are in the range of 2.0 to 5.0 mm.

9. The vehicle tire according to claim 8, wherein said end portions of the sipes are disposed in a line parallel to the tire axial direction.

* * * * *